Sept. 17, 1957  D. W. ADAMS  2,806,948
ELECTRONIC FAST-TIME CONSTANT SWITCH
Filed July 16, 1954
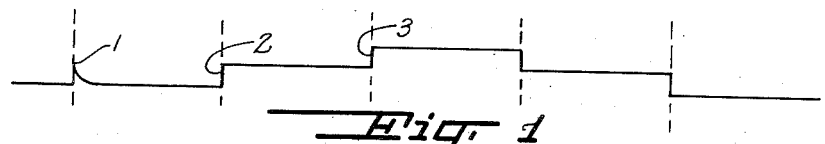
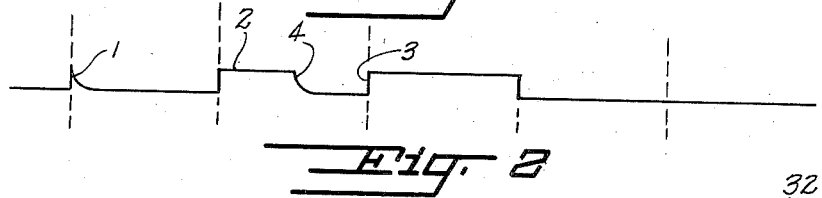
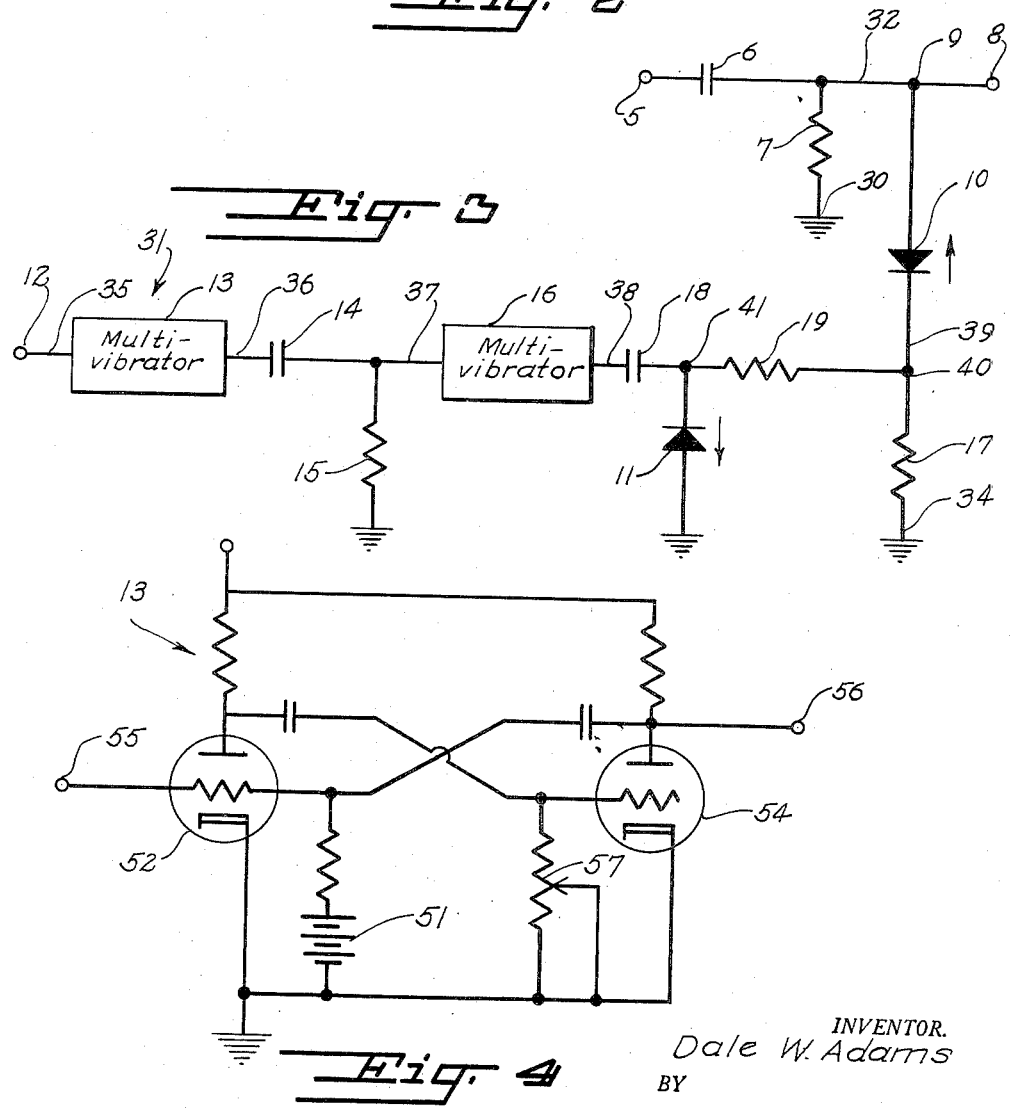
INVENTOR.
Dale W. Adams
BY
McMorrow, Berman + Davidson
ATTORNEYS

United States Patent Office 2,806,948
Patented Sept. 17, 1957

2,806,948

ELECTRONIC FAST-TIME CONSTANT SWITCH

Dale W. Adams, St. Francis, Kans.

Application July 16, 1954, Serial No. 443,897

7 Claims. (Cl. 250—27)

This invention relates to radar signal receiving circuits, and more particularly to an improved electronic fast-time constant switch circuit which may be employed with presently existing radar receiving sets, and which may be incorporated as a modification in radar receiving sets of current design, or which may be built internally into new radar receiving sets.

A main object of the invention is to provide a novel and improved electronic fast-time constant switch for use with a radar signal receiving circuit of the type having a relatively long time constant in order to provide clearer detection of targets and to more clearly distinguish between target indications and spurious indications, such as are obtained from clouds, ground returns, or other obstacles.

A further object of the invention is to provide an improved electronic fast-time constant switch for use with radar signal receiving circuits, said switch involving relatively simple components, being reliable in operation, and operating to clarify an indication produced by a target by positively discriminating between the indication produced by the target and the spurious indications which may be produced by ground returns, clouds, and the like.

A still further object of the invention is to provide an improved electronic fast-time constant switch device for use with radar signal receiving circuits of the type having a relatively long time constant, said switch device being adapted to be connected across the output terminals of the receiving circuit to separate radar signals from spurious signals, such as ground returns, and the like, the improved switch device involving inexpensive components, being dependable in operation, and enabling the indication produced by a target, even if relatively small, to be distinguished from spurious indications, such as those produced by ground returns.

Further objects and advantages of the invention will become apparent from the following description and claims, and from the accompanying drawings, wherein:

Figure 1 is a wave-shape diagram illustrating the voltage wave-time pattern of normal video signal information passing through a conventional long time constant resistance-capacity circuit, such as is employed in a radar signal receiving system.

Figure 2 is a wave-shape diagram similar to Figure 1 and showing the voltage wave-time pattern of the signal of Figure 1 when passing through a radar circuit provided with an improved electronic fast-time constant switch according to the present invention and illustrating the manner in which the ground return signal is separated from the indication produced by a target.

Figure 3 is a schematic wiring diagram, partly in block form, illustrating an improved electronic fast-time constant switch according to the present invention and showing the manner in which the electronic fast-time constant switch is connected to the output circuit of a radar signal receiving set.

Figure 4 is a schematic wiring diagram of one of the multivibrators employed in the electronic fast-time constant switch arrangement of Figure 3.

A prime purpose of the present invention is to provide a relatively simple and compact unit, employing few parts, which is especially suitable for attachment to already existing radar sets, or which may be incorporated into the designs of new radar sets, the device being intended to provide a clearer detection of targets by separating spurious indications, such as those obtained by ground returns, clouds, and similar obstacles, from the indications obtained from the targets. Referring to Figure 1, a typical voltage wave-time pattern is illustrated, this pattern representing the voltage wave passing through any conveniently selected, long time constant, resistance-capacity circuit in a radar receiving set, for example, the circuit shown in Figure 3 which includes the capacitance 6 and the resistor 7, the resistor 7 being connected across the output terminals of the selected portion of the radar receiving set, one of the output terminals being shown at 8, and the other output terminal constituting the ground, shown at 30. The ungrounded input terminal of this portion of the radar receiving set is designated at 5.

As shown in Figure 3, the electronic fast-time constant switch, designated generally at 31, is connected across the output terminals of the above described portion of the radar receiving set, for example, between a point 9 along the output conductor 32 and ground, designated by the reference numeral 34.

In Figure 1, the reference numeral 1 designates the main or synchronizing triggering pulse which starts the sweeps of the radar oscilloscopes. Designated at 2 is the video signal produced by a cloud, ground return, or similar obstacle. Designated at 3 is the video signal produced by a target, such as an aircraft, or the like, which is flying above the ground which gives the spurious ground return signals.

As will be apparent from Figure 1, whenever the video indication produced by the target, namely, the wave element 3, is relatively small, as compared with the video signal produced by the ground return, namely, the signal which produces the wave element 2, it is very difficult to distinguish between the target indication 3 and the ground return indication 2. A main purpose of the present invention is to overcome this difficulty.

Referring now to Figure 3, the electronic fast-time constant switch 31 comprises an input terminal 12 which is connected through a conductor 35 to the input of a first multivibrator 13. The output conductor 36 of the multivibrator 13 is connected through a condenser 14 to the input conductor 37 which is connected to a second multivibrator 16. A resistor 15 is connected between the conductor 37 and ground, thereby defining a differentiating circuit, in conjunction with the condenser 14, between the output of the first multivibrator 13 and the input of the second multivibrator 16. The output wire 38 of the second multivibrator 16 is connected through a relatively large condenser 18 and a resistor 19 having a relatively high resistance value to a conductor 39. Conductor 39 is connected to the ground point 34 through a relatively low resistance 17. Connected between the point 9 on the radar output circuit conductor 32 and the conductor 39 is a first rectifier 10 which is polarized to allow electrons to flow from the conductor 39 to the conductor 32, namely which is polarized so that current can flow therethrough from conductor 32 to conductor 39 only when the junction point 40 between resistor 17 and conductor 39 is at a lower potential than the connection point 9. Designated at 41 is the common junction point between the condenser 18 and the resistor 19. Connected between the junction point 41 and ground is a second rectifier 11 which is polarized to allow flow of electrons only in the direction of the arrow shown adjacent the rectifier 11, namely, from the junction point 41 to ground. In other words, current will flow from ground to junction point 41 when the potential of the junction point 41 drops below ground potential.

The rectifiers 10 and 11 can be diodes, triodes, selenium rectifiers, or the like, and are illustrated with connections which assumes the video applied at the input terminal 5 to be of positive polarity. The arrows located adjacent the rectifiers in Figure 3 show the direction of the electron flow when the rectifiers are conducting. The connections of the rectifiers will be reversed if the video applied to the input terminal 5 is of a negative polarity.

Condenser 18 and resistor 19 are of large values to prevent the condenser from fully charging. Thus a positive voltage is normally dropped across the resistors 17 and 19. Resistor 17 has a small resistance so that it can reduce the time constant of the resistance-capacity circuit defined by condenser 6 and resistor 7 whenever the rectifier 10 conducts.

The two multivibrators 13 and 16 are of a type providing one square wave out for each trigger pulse in.

Figure 4 illustrates the circuit connections of a "one-shot" multivibrator of a type which may be employed for the first multivibrator 13 of Figure 3. The multivibrator shown in Figure 4 is substantially of conventional construction and includes a first triode 52 interconnected in the manner shown with a second triode 54. The multivibrator has the input terminal 55 and the output terminal 56. The triode 52 is normally cut off by fixed negative bias provided by the battery 51. A positive triggering pulse may be applied to the input terminal 55, which will produce a square wave at the output terminal 56 whose length can be varied by the operator by means of a variable grid resistance 57 employed with the triode 54, so that the duration of the square wave generated by the first multivibrator can be regulated in accordance with the operator's choice.

The output of the first multivibrator 13, consisting of a square wave, is sent through the differentiating circuit defined by the condenser 14 and the resistor 15. The trailing edge of this square wave acts as a short trigger which occurs at a time value corresponding to the point 4 shown in Figure 2 and which acts to trigger the second multivibrator 16.

The output of the second multivibrator 16 is a short pulse of the order of one or two microseconds in duration, this pulse being of a negative polarity (when the video applied to the input terminal 5 is of positive polarity). The output pulse of the second multivibrator 16 is positive in polarity when the video applied to the input terminal 5 is negative. In the arrangement illustrated in Figure 3 the video signal is assumed to be positive, and hence, the pulse provided by the second multivibrator 16 is negative in polarity.

It will be understood that the positive (or negative) incoming triggering pulse 1 is applied to the input terminal 12 in Figure 3, this pulse acting to trigger the first multivibrator 13.

Resistor 17 normally has a positive potential existing thereacross, namely, the junction point 40 is positive with respect to ground, because condenser 18 is charging through the resistor 17, as well as through the resistor 19, so that no electrons flow through the rectifier 10.

When the second multivibrator 16 discharges its negative square pulse, the condenser 18 quickly discharges through the rectifier 11, reducing the potential across resistor 17 to zero, namely, bringing the junction point 40 to ground potential, allowing electrons to flow through the rectifier 10 and through the resistor 17, for a short period of the order of one or two microseconds, corresponding to the length of the negative pulse delivered by the multivibrator 16. Since electrons can flow through the rectifier 10, the time constant of the resistance-capacity circuit defined by condenser 6 and resistor 7 is reduced, said reduction occurring at a time corresponding to the point 4 on the voltage wave diagram of Figure 2.

Whenever the time constant of the resistance-capacity circuit defined by condenser 6 and resistor 7 is reduced, as at the point 4 in Figure 2, the video of the ground returns, shown at 2 in Figures 1 and 2, is differentiated, but not the video 3 of the target. This separates the indications of the target and the ground returns and gives a full indication of the target.

It will be understood that condenser 18 and resistor 19 are of large values to prevent the condenser 18 from fully charging. Thus, under normal conditions a substantial positive voltage exists across the series circuit defined by the resistors 17 and 19. Thus, the side of condenser 18 connected to the junction point 41 is at a high positive potential. When the negative pulse is generated at the output of the multivibrator 16, the opposite side of the condenser is dropped suddenly in potential by the application thereto of the negative pulse, causing the condenser to discharge rapidly. This discharge takes place through the rectifier 11 and has the effect of reducing the potential across the resistor 17 to zero. Thus, for the short period of the order of one or two microseconds, namely, for the length of the negative pulse, the resistance-capacity circuit defined by condenser 6 and resistor 7 operates as if it had a short time constant, whereby the ground return indications 2 are differentiated but not the video indications 3 produced by the target.

By adjusting the variable resistor 57 of the first multivibrator 13, the time point at which the differentiation of the ground returns, namely, the point 4 in Figure 2, occurs may be adjusted by the operator to provide a clear showing of the target indication 3. As shown in Figure 2, the target indication 3 is thus clearly and unmistakably separated from the ground return indication 2, and it will be clearly apparent from Figure 2 that by adjusting the resistor 57 of the first multivibrator, the point 4 may be made to occur at any location on the sweep chosen by the operator.

While a specific embodiment of an improved electronic fast-time constant switch device for use with radar signal receiving sets has been disclosed in the foregoing description, various modifications within the spirit of the invention may occur to those skilled in the art. Therefore, it is intended that no limitations be placed on the invention except as defined by the scope of the appended claims.

What is claimed is:

1. In combination with a radar signal receiving circuit of a resistance-capacity type and having a relatively long time constant, an electronic fast-time constant switch connected across the output terminals of said receiving circuit to separate radar signals from ground returns, said switch comprising a first multivibrator adapted to yield a square wave output signal responsive to a triggering pulse supplied thereto, a second multivibrator, a differentiating circuit connected between the first and second multivibrators and arranged to trigger the second multivibrator responsive to said square wave output signal at a predetermined time after the triggering pulse is applied to the first multivibrator, said second multivibrator being arranged to provide an output pulse of opposite polarity to that of the radar signal applied to the receiving circuit, a first rectifier and a low value resistor connected in series across the output terminals of said receiving circuit, a condenser and a second receifier connected in series across the output terminals of the second multivibrator, and a second resistor connected between the respective common terminal junctions of the first rectifier and low value resistor and the condenser and second rectifier, said rectifiers having terminals of common polarity connected to the respective opposite terminals of the second resistor.

2. In combination with a radar receiving circuit of the resistance-capacity type having a relatively long time constant, means for rapidly discharging the circuit in response to a ground return signal comprising a first multivibrator, a second multivibrator, a differentiating circuit connected between said multivibrators and arranged to trigger the second multivibrator responsive to a ground return signal applied to the first multivibrator, said second multivibrator being arranged to yield a derived signal opposite in polarity to said ground return signal at a predetermined time after the application of the ground return signal, a condenser and a first rectifier connected between the output of the second multivibrator and the output of the receiving circuit, said rectifier being polarized to normally prevent discharge of the signal receiving circuit, and a second rectifier connected to said condenser and arranged to discharge said condenser responsive to said derived signal and to cause discharge of said receiving circuit through said first rectifier.

3. In combination with a signal receiving circuit of the type having a relatively long discharge time constant, a relatively low resistance discharge circuit, a normally non-conducting rectifier connected between said discharge circuit and signal receiving circuit, a relatively long time constant charging circuit connected to said discharge circuit, a second rectifier connected in circuit with said charging circuit and said discharge circuit, and means for discharging said charging circuit through said second rectifier in response to and at a predetermined time interval after the reception of a triggering pulse by said signal receiving circuit, whereby the potential across said discharge circuit is reduced sufficiently to cause the first-named rectifier to conduct and to reduce the discharge time constant of the signal receiving circuit.

4. In combination with a signal receiving circuit of the type having a relatively long discharge time constant, a relatively low resistance discharge circuit, a normally non-conducting rectifier connected between said discharge circuit and signal receiving circuit, a relatively long time constant charging circuit connected to said discharge circuit, a second rectifier connected in circuit with said charging circuit and said discharge circuit, and a multivibrator circuit connected to said charging circuit and arranged to discharge said charging circuit through said second rectifier in response to and at a predetermined time interval after the reception of a triggering pulse by said multivibrator circuit, whereby the potential across said discharge circuit is reduced sufficiently to cause the first-named rectifier to conduct and to reduce the discharge time constant of the signal receiving circuit.

5. In combination with a signal receiving circuit of the type having a relatively long discharge time constant, a relatively low resistance discharge circuit, a normally non-conducting rectifier connected between said discharge circuit and signal receiving circuit, a relatively long time constant charging circuit connected to said discharge circuit, a second rectifier connected in circuit with said charging circuit and said discharge circuit, and a multivibrator circuit connected to said charging circuit and arranged to apply a discharging potential to said charging circuit to cause said charging circuit to discharge through said second rectifier in response to and at a predetermined time interval after the reception of a triggering pulse by said multivibrator circuit, whereby the potential across said discharge circuit is reduced sufficiently to cause the first-named rectifier to conduct and to reduce the discharge time constant of the signal receiving circuit.

6. In combination with a signal receiving circuit of the long time constant type, means for reducing the time constant of the receiving circuit at a predetermined time interval after the reception of a triggering pulse by the receiving circuit comprising a low resistance discharge circuit, a rectifier connected between said discharge circuit and said signal receiving circuit, said rectifier being polarized to prevent current flow from said signal receiving circuit to said discharge circuit as long as a substantial potential exists across said discharge circuit, a source of potential connected across said discharge circuit, a second rectifier connected across said discharge circuit and polarized to prevent current flow therethrough when said source has a first polarity, means connected to said source of potential and arranged to reverse its polarity in response to and at a predetermined time interval after the reception of said triggering pulse, and means whereby the second rectifier then conducts and sufficiently reduces the potential across said discharge circuit to cause the first rectifier to conduct.

7. In combination with a signal receiving circuit of the long time constant type, means for reducing the time constant of the receiving circuit at a predetermined time interval after the reception of a triggering pulse by said signal receiving circuit comprising a low resistance discharge circuit, a rectifier connected between said discharge circuit and said signal receiving circuit, said rectifier being polarized to prevent current flow from said signal receiving circuit to said discharge circuit as long as a substantial potential exists across said discharge circuit, a charging circuit including a substantial capacitance in series with a substantial resistance and a voltage source connected across said discharge circuit, a second rectifier connected across said charging circuit and polarized to prevent current flow therethrough when the potential across said capacitance has a first polarity, means connected to said voltage source and arranged to reverse the polarity of the potential across said capacitance in response to and at a predetermined time interval after the reception of said triggering pulse, and means whereby the second rectifier then conducts and sufficiently reduces the potential across said discharge circuit to cause the first rectifier to conduct.

References Cited in the file of this patent

UNITED STATES PATENTS

| | | |
|---|---|---|
| 2,402,916 | Schroeder | June 25, 1946 |
| 2,462,859 | Grieg | Mar. 1, 1949 |
| 2,603,708 | Anger | July 15, 1952 |

FOREIGN PATENTS

| | | |
|---|---|---|
| 1,025,157 | France | Jan. 21, 1953 |

OTHER REFERENCES

"Radar System Engineering," vol. 1 of Radiation Laboratory Series, published 1947.